United States Patent Office 2,841,474
Patented July 1, 1958

2,841,474

METHOD OF PREPARING CHLORINATED DICYANDIAMIDE

Rowell R. Dorsett, Baltimore, Md., assignor of one-half to Mangels, Herold Company, Inc., Baltimore, Md., a corporation No Drawing. Application June 12, 1956
Serial No. 590,832

7 Claims. (Cl. 23—190)

This invention relates to a chlorinated dicyandiamide product which is an effective bleaching agent and to a method of producing the same.

An object of this invention is to produce a chlorinated dicyandiamide product which is an effective bleaching agent.

A further object of the invention is to provide a chlorinated dicyandiamide product which in aqueous solution is an effective bleaching agent for goods such as nylon and cellulosic materials and has the property of inhibiting degradation of such goods when bleached in a solution thereof.

A still further object of the invention is to provide a method for producing a chlorinated dicyandiamide bleaching composition which is aqueous solution has the property of inhibiting degradation of goods such as nylon and cellulosic materials.

Another object of the invention is to provide a method of chlorinating dicyandiamide that consists in forming a slurry of dicyandiamide, mineral acid or a (COOH) acid and water or in lieu of water a hydrocarbon such as carbon tetrachloride or tetrachloroethane or ethyl or methyl alcohol, heating the slurry for a predetermined length of time to hydrolyze the dicyandiamide, neutralizing the slurry to a pH of about 7+ with sodium or potassium hydroxide, and then chlorinating the neutralized slurry with an equeous solution of sodium or potassium chlorite for a period of time sufficient to give the available chlorine content desired in the product.

A further object is to provide a method as in the next preceding object which results in a product having the property of inhibiting degradation of nylon and cellulosic fibres in aqueous solution when phosphoric acid is employed in the slurry, and which when mineral or acids of the (COOH) type are employed in the slurry, results in a product that can be inhibited against degradation by the employment of molecularly dehydrated phosphate in the bleaching solution of the product.

The chlorinated dicyandiamide product of this invention is a white to yellowish crystalline material having an available chlorine content up to about 85% based on the weight of the product. The color of the crystals is either white or a faint yellow depending on the kind of acid employed in its manufacture.

The crystalline chlorinated dicyandiamide of this invention is free flowing, stable, relatively non-hydroscopic, and has good stability on storage. Furthermore, the odor of chlorine is low both in the product and in a solution thereof, and it has low toxicity to human beings and safe for normal bleaching use.

The product may be produced by making a slurry of dicyandiamide, mineral acid or a COOH acid, and water or a hydrocarbon or ethyl or methyl alcohol, and heating the slurry to about 160° F. for one hour or so to hydrolize the dicyandiamide. The slurry is then neutralized with a caustic such as sodium or potassium hydroxide in concentration and amount sufficient to bring the slurry to a pH of about 7. To the neutralized slurry a solution of sodium chlorite or other positive chlorine source is added, the amount added and the time of chlorination being such as to produce the highest desired degree of chlorination. The sodium chlorite supplies positive chlorine which effectively chlorinates the neutralized dicyandiamide slurry. The time of chlorination may be as long as three hours.

After the slurry has been chlorinated, it is either air-dried or dried under vacuum whereby a final crystallized chlorinated dicyandiamide product results. If the slurry is formed with phosphoric acid, the crystalline product is white; whereas if sulphuric or hydrochloric acid is used in the slurry, yellowish crystals result. A ¼% solution of this product has a pH of about 7.7 to 8.2.

Instead of using water in the preparation of the slurry, the slurry may be prepared with dicyandiamide, mineral acid and a liquid hydrocarbon. The hydrocarbon may either be carbon tetrachloride or tetrachloroethane. Ethyl or methyl alcohol may also be used instead of water.

The chlorinated dicyandiamide is an effective bleaching agent when acidified, and readily soluble in water. Acidified aqueous solutions of the product are effective bleaches and may be used for bleaching nylon, sulfite paper, wood, as in the bleaching of wood furniture and panels, and for other purposes.

The bleaching of nylon without degrading it is a difficult problem, and much research has been done on it. The pronounced tendency of white nylon goods to yellow has militated against use in wearing apparel.

An acidified solution of the chlorinated dicyandiamide product of this invention, when produced from a slurry in which phosphoric acid is used, will effectively bleach nylon and cellulosic soft goods without degrading the same within practical limits.

When the chlorinated dicyandiamide product is made from a slurry in which mineral acid or an acid of the COOH type is employed, the product is an effective bleaching agent in aqueous solution when acidified. Any tendency of the solution to degrade nylon or cellulosic soft goods may be inhibited by adding a phosphate, preferably a molecularly dehydrated phosphate, to the bleach solution.

For reasons not known, at least not generally known, new white nylon yellows on storage—it also yellows from use and repeated washings. The yellow color cannot be bleached out with alkaline bleaches without materially degrading the fibres of the fabric. The chlorinated dicyandiamide of this invention will restore the yellowed nylon to a whiteness substantially equal to its new condition without degrading it to any significant extent.

The chlorinated dicyandiamide product of this invention may be used as a bleach by making an aqueous solution containing the desired content of available chlorine. If the amount of available chlorine desired is say 1% in aqueous solution, and if the chlorine content of the product is 85%, 1.25 pounds of the chlorinated dicyandiamide in 98.75 pounds of water will provide a 1% solution of available chlorine. In other words, the amount of the product added is related to 100% available chlorine. To the aqueous solution of the chlorinated dicyandiamide an acidifying agent is added, such for example as phosphoric, hydrochloric, sulfuric, acetic and other acids of the COOH type that will adjust the pH of the solution to the desired value which can be within the range of from say pH 2.5 to pH 6.5.

In the bleaching of fabrics, such as nylon, cotton and fabrics composed of fibres of cellulosic materials, in a solution of the chlorinated dicyandiamide made from a slurry employing mineral or COOH type acid, molecularly dehydrated phosphate is added to the bleaching solution in amount sufficient to prevent degradation of the fibres. The amount of phosphate added can vary from 10% to 40% of the total solution involved. The molecularly dehydrated phosphates include the alkali metal phosphate glasses having a ratio of $M_2O$ to $P_2O_5$ of less than 1 to 1 to about 1.7 to 1. At the ratio of about 1.7 to 1 crystalline tripolyphosphate and pyrophosphate crystals commence to form.

These phosphates also include alkali metal tripolyphosphate and the alkali metal pyrophosphates. Alkali metal is designated by the symbol M and may be either sodium, potassium or ammonium.

The chlorinated dicyandiamide product may also be used in solution with synthetic detergents of the types sold under product or trade name "Santomerse" produced by the Monsanto Chemical Company and other similar detergents. Such detergents are compatible with acidic solutions. Therefore, when the chlorinated dicyandiamide is added to an aqueous solution which is acidified to a pH in the acid range, and containing a synthetic detergent the resulting solution has bleaching and detergent properties.

The process for preparing chlorinated dicyandiamide may be in accordance with the steps given in the following examples:

*Example I*

(a) Dicyandiamide 10 to 70 parts by weight
(b) Phosphoric acid ($H_3PO_4$) 7 to 60 parts by weight
(c) Water 20 to 80 parts by weight The foregoing ingredients were mixed together and heated slowly to a temperature of 140 degrees F. and held at that temperature for one hour to form a slurry. The slurry was neutralized with sodium hydroxide to a pH of 7+.

A solution of 20 to 70 parts of sodium chlorite in 50 parts of water was prepared. 10 to 70 parts of the foregoing sodium chlorite solution or other solution that will supply positive type chlorine were added to the neutralized slurry and allowed to react for one to three hours. Water was removed under vacuum. A white dry crystalline product resulted, the product being free flowing, stable on storage, of low toxicity to humans, and having a low odor of chlorine as a powder and in solution and having an available chlorine content up to about 85% by weight. An aqueous solution of the product does not require molecularly dehydrated phosphate to inhibit degradation of the goods.

*Example II*

The following were mixed together in the proportions indicated:

(a) Dicyandiamide 25 parts by weight
(b) Phosphoric acid ($H_3PO_4$) 25 parts
(c) Water 50 parts The foregoing mixture was heated slowly to a temperature of 130° F. to 160° F. and held at that temperature for one hour to form a slurry. The slurry was neutralized with sodium hydroxide (NAOH) to a pH of 7.

A solution of 25 parts of sodium chlorite in 50 parts of water was prepared. The sodium chlorite solution was added to the neutralized slurry and allowed to react for 1½ hours. Water was removed under vacuum whereupon a white free flowing product of crystalline structure resulted. The product was stable on storage, had a low toxicity to humans and a low odor of chlorine in the powder form and in solution as well, and had an available chlorine content up to about 85% by weight.

In the Examples I and II, the amount of chlorine contained in the end product is determined by the length of time that the neutralized slurry is allowed to react with the sodium chlorite solution. An aqueous solution of this product does not require phosphates to inhibit degradation of goods bleached therein.

In the foregoing Examples I and II, sulphuric acid or hydrochloric acid may be used in lieu of phosphoric acid. Also in the foregoing examples, a hydrocarbon, such as carbon tetrachloride or tetrachloroethane or ethyl or methyl alcohol may be used in lieu of water.

The slurries of the foregoing examples may be neutralized with potassium hydroxide instead of sodium hydroxide. The product may be packaged safely.

When used, the product is dissolved in water to provide a solution containing about 1% available chlorine. The solution may be acidified with acid phosphates, such as the monosodium dihydrogen orthophosphate or mineral and or organic acids. As stated above, the chlorinated dicyandiamide product is self-inhibiting against degradation of the soft goods bleached in solutions thereof when the product is made from a slurry which has been acidified with phosphoric acid. When an acid other than phosphoric is used in preparation of the slurry, molecularly dehydrated phosphate such as the alkali metal phosphate glasses, alkali metal tripolyphosphate and the alkali metal pyrophosphates may be used with acidified solutions of the chlorinated dicyandiamide to inhibit degradation of fabrics bleached therein.

The amount of the acidifying agent employed is such as to produce the desired pH value which can be from about pH 2 to under pH 7. The preferred pH range is from 3 to 6.5.

The following data are test results on cotton sheeting, unbleached but wet out and used in the test. In the test the strength of the warp and the filling was measured before bleaching. The following tabulations indicate how the test was formed and the results:

| Unbleached | Warp | Filling |
|---|---|---|
| Strength in pounds on Scott Tester | 80 | 60 |
| Solution containing 500 parts per million of chlorinated dicyandiamide solution adjusted to pH 3.2—goods bleached 30 minutes at 160° F | 54 | 32 |
| Solution containing 500 parts per million of chlorinated dicyandiamide and a 20% solution of monosodium dihydrogen phosphate the solution adjusted to pH 3.2, goods bleached 30 minutes at 160° F | 78 | 59 |
| Bleaching solution of calcium oxichloride (CAOCl) 500 parts per million in solution pH 9.6, goods bleached 30 minutes at 160° F | 27 | 19 |

The results of the above tests show the initial strength of the unbleached goods, the loss in strength of the warp and the filling where the chlorinated dicyandiamide did not contain a phosphate, the strength after bleaching with phosphate in solution, the value showing only an insignificant loss in strength on the warp and the filling.

The loss in strength resulting from the use of calcium oxychloride was very significant and substantial.

The following shows the results of bleaching use-yellowed nylon garments on solution containing the chlorinated dicyandiamide and sodium "Lorol" sulfate. The bleach bath contained 0.1% sodium "Lorol" sulfate and 1.13% chlorinated dicyandiamide. The bleach bath was at a temperature of 70° C., and the bleach cycle was two hours.

A set of 7 use-discolored fabrics having an average yellowness of 7.1 +b units as measured on a differential colorimeter had an average yellowness of 3.1 +b units after bleaching in the above solution. This is an acceptable shade of whiteness.

In another test the following use-yellowed nylon garments having the +b value of whiteness indicated were bleached in a chlorinated dicyandiamide solution containing about 1.13% of the material.

| Garment | +b Value | After bleaching, +b Value |
|---|---|---|
| blouse | 2.5 | 2.5 |
| shirt | 3.3 | 2.6 |
| slip | 3.7 | 2.4 |
| shirt | 4.2 | 3.1 |
| shirt | 4.3 | 2.8 |
| slip | 4.9 | 3.1 |
| slip | 5.3 | 3.6 |
| shirt | 5.3 | 3.0 |
| blouse | 6.1 | 2.8 |
| shirt | 6.9 | 3.1 |
| slip | 8.0 | 3.8 |
| sweater | 11.7 | 4.0 |

After bleaching the blouse having the +b value of 2.5 had a reflectance b value of 2.5. The average +b value for the other garments was approximately 3.06. The +b values for the respective garments after bleaching is indicated in the column +b value after bleaching.

Seven use-yellowed nylon garments were bleached in a solution of chlorinated dicyandiamide yielding about 1% available chlorine, and adjuvants as indicated in the following table. The table gives the pH of the solutions and the average b value (the degree of whiteness resulting after bleaching). Chlorinated dicyandiamide was present in each of the following in amount to give about 1% available chlorine.

| Garment | Adjuvants | pH of Solution | Avg. b Value |
|---|---|---|---|
| 1 | Na₂SO₄, Na₂H₂P₂O₇, NaNO₃, sulfamic acid | 3.2 | 2.8 |
| 2 | Na₂SO₄, Na₂H₂P₂O₇, NaNO₃, less sulfamic acid | 5.0 | 3.4 |
| 3 | Na₂SO₄, Na₂H₂P₂O₇ Na diacetate | 5.3 | 3.6 |
| 4 | Na₂SO₄, "Calgon," benzoic acid | 3.9 | 3.3 |
| 5 | Na₂H₂P₂O₇, synthetic detergent | 5.8 | 3.1 |
| 6 | Acetic acid | 5.5 | 3.3 |
| 7 | Na "Lorol" sulfate (0.2%), Acetic acid | 3.5 | 2.1 |

From the foregoing it is apparent that a process has been provided whereby dicyandiamide may be chlorinated to provide a very effective bleaching agent and which agent is effective in acid solutions with or without detergents. The foregoing also discloses the product chlorinated dicyandiamide and its properties.

Having thus described the invention it will be apparent to those of ordinary skill in the art to which the invention pertains that various modifications and changes may be made in the invention without departing from either the spirit or the scope thereof.

Therefore, what is claimed as new and desired to be secured by Letters Patent is:

1. The method of producing chlorinated dicyandiamide that consists in mixing

Parts by weight
(a) Dicyandiamide _____ 10 to 70
(b) Phosphoric acid ($H_3PO_4$) _____ 7 to 60
(c) Water _____ 20 to 80 heating the mixture to a temperature of about 130° F., to 160° F., for a period of about one hour, neutralizing the slurry with caustic to a pH of about 7, adding to the neutralized slurry a solution of sodium chlorite in 50 parts of water and reacting the neutralized slurry with the chlorite for from 1 to 3 hours, and then evaporating the chlorinated slurry to dryness.

2. A method as in claim 1 in which (a), (b), and (c) are 25, 25 and 50 parts by weight, respectively.

3. The method as in claim 1 in which (a), (b) and (c) are 25, 25 and 50 parts by weight, respectively and the caustic is sodium hydroxide.

4. The method as in claim 2 in which the sodium chlorite solution consists of 25 parts by weight sodium chlorite and 50 parts by weight of water.

5. The method of producing chlorinated dicyandiamide that consists in mixing (a) dicyandiamide 10 to 70 parts by weight, (b) mineral acid of the group consisting of phosphoric, sulphuric and hydrochloric 7 to 60 parts by weight, (c) a solvent of the group consisting of water, carbon tetrachloride, tetrachloroethane, ethyl and methyl alcohol—20 to 80 parts by weight, heating the mixture to a temperature of about 130° F. to 160° F. for a period of about 1 hour, neutralizing the slurry with caustic to a pH of about 7, adding to the neutralized slurry an aqueous solution of sodium chlorite containing from 20 to 70 parts by weight of sodium chlorite in 50 parts of water and reacting the neutralized slurry with the chlorite for from 1 to 3 hours, and then evaporating the chlorinated slurry to dryness.

6. A method as in claim 1 in which the caustic is a member of the group consisting of sodium and potassium hydroxide.

7. The method of producing chlorinated dicyandiamide that consists in mixing (a) dicyandiamide 25 parts by weight, (b) mineral acid consisting of the group of phosphoric, hydrochloric and sulphuric 25 parts by weight, (c) a solvent of the group consisting of water, carbon tetrachloride, tetrachloroethane, alcohol ($C_2H_5OH$) and methyl alcohol—50 parts by weight, heating the mixture to a temperature of about 130° to 160° F. for a period of 1½ hours, neutralizing the mixture of (a), (b) and (c) with caustic to a pH of about 7, adding to the neutralized mixture an aqueous solution of sodium chlorite containing about 25 parts sodium chlorite in 50 parts of water and reacting the neutralized mixture with the chlorite for from 1 to 3 hours and then evaporating the chlorinated mixture to dryness.

References Cited in the file of this patent

UNITED STATES PATENTS

| | | |
|---|---|---|
| 2,184,883 | Muskat et al. | Dec. 26, 1939 |
| 2,184,888 | Muskat et al. | Dec. 26, 1939 |
| 2,357,261 | Kaiser | Aug. 29, 1944 |
| 2,512,037 | Paden et al. | June 20, 1950 |